Patented Feb. 11, 1930

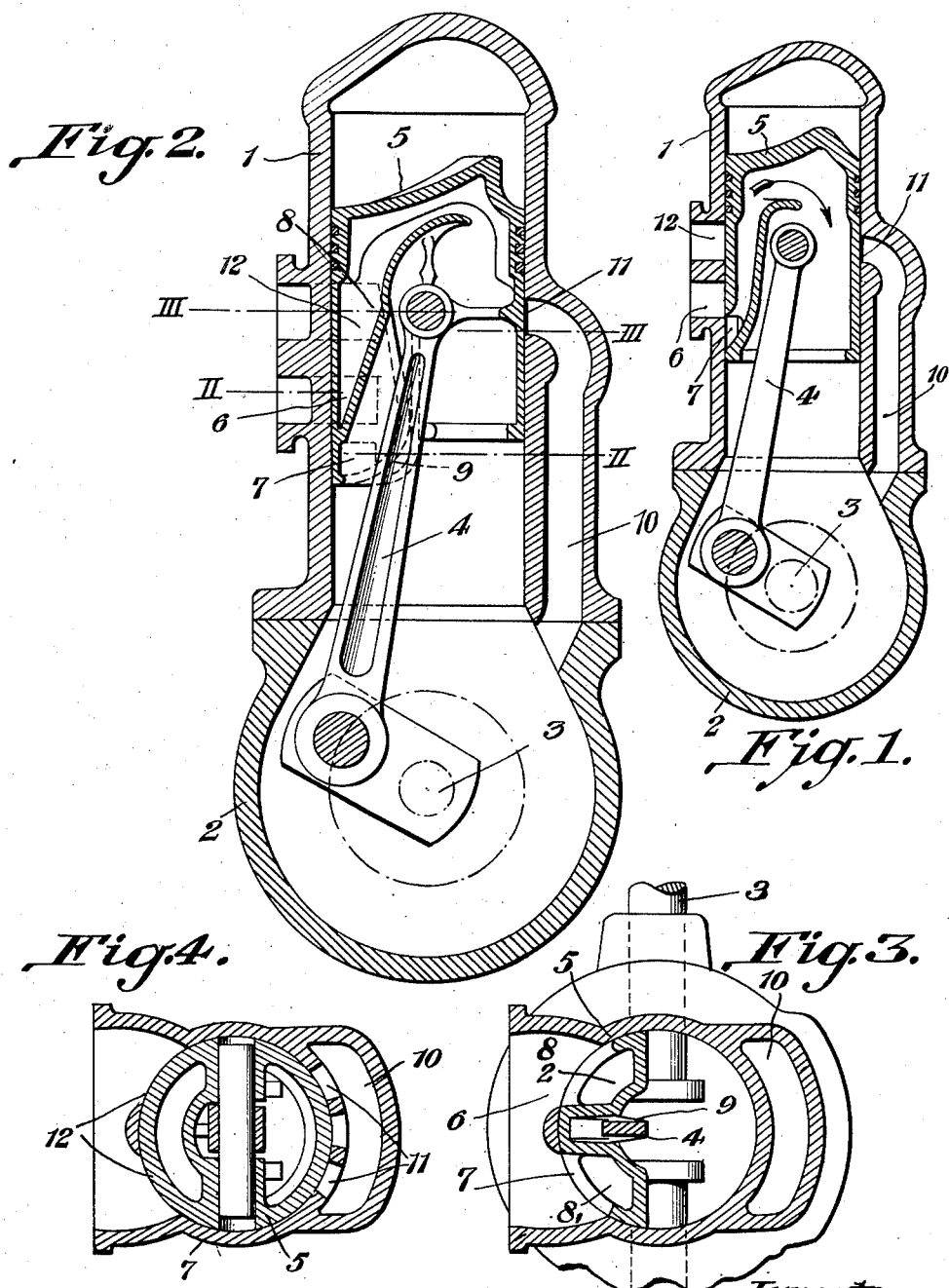

1,746,768

UNITED STATES PATENT OFFICE

LÉON DUFOUR, OF VERSOIX, SWITZERLAND

INTERNAL-COMBUSTION MOTOR

Application filed January 12, 1927, Serial No. 160,744, and in Germany January 29, 1926.

The present invention relates to internal combustion engines and more particularly to engines of the two cycle trunk piston type.

It is a well known fact that an efficient means for increasing the output of an internal combustion engine consists in cooling the piston to the utmost.

It is an object of the invention to provide a two cycle internal combustion engine with means for cooling the piston by the circulation of the combustible mixture through the piston and for this purpose the piston comprises a passage arranged to conduct the combustible mixture into the interior thereof to beneath the piston head before entering the crank case, this passage being arranged in such a way so as not to obstruct the oscillating movement of the piston rod.

The invention is illustrated in the accompanying drawing in which:

Fig. 1 is a vertical section of a two cycle internal combustion engine, the section being taken through the inlet and exhaust ports of the cylinder.

Fig. 2 is a central, vertical section drawn to a larger scale.

Fig. 3 is a transverse section on line II—II of Fig. 2.

Fig. 4 is a transverse section on line III—III of Fig. 2.

In the figures, 1 indicates the cylinder secured to the crank case 2 surrounding the crankshaft 3 which is connected to the piston 5 by means of the connecting rod 4. The cylinder is provided with two inlet ports 6 which, at the end of the ascending stroke of the piston, register with two openings 7 provided at the bottom of the piston skirt. These two openings communicate with the two branches $8_1$ and $8_2$ of the passage 8 which is cast into the piston. The branches extend from the bottom end of the piston to about the height of the wrist pin where they are united to form the single passage 8 which ends below the piston top. The two branch passages $8_1$ and $8_2$ leave between themselves a space 9 extending up to the piston wall, thereby leaving the entire diameter of the piston free for the oscillation of the piston rod as can be seen from Figure 3. The crank case 2 is connected to the cylinder by means of the transfer passage 10 and the inlet ports 11. 12 indicates the exhaust ports.

The operation of the engine is the following: During the ascending stroke of the piston a partial vacuum is formed in the crank case and when the piston arrives near the upper dead center the two openings 7 in the piston are opposite the inlet ports 6 in the cylinder. Combustible mixture is then drawn from the carburetor, which is not shown, through the ports 6, the openings 7, the two branches $8_1$ and $8_2$, and the passage 8 towards the piston top and from there flows downwardly into the crank case 2. During the downward stroke of the piston the charge is compressed in the crank case and after the piston uncovers the inlet ports 11 flows through the transfer passage 10 into the cylinder and drives the burnt gases out through the exhaust ports 12 in the well known manner of two cycle engines.

With a construction as described it is possible to use the method of cooling the piston with combustible mixture even for very small trunk type pistons.

I claim:

In a two cycle internal combustion engine with a crank case scavenging pump, a crank shaft, a cylinder provided with inlet and exhaust ports, a conduit in the cylinder wall for connecting the crank case with said inlet ports, a piston within said cylinder, a connecting rod between said piston and said crank shaft, and a passage formed in said piston for conducting the combustible mixture into the interior thereof to beneath the piston head, said passage dividing towards the inlet end thereof in two branches adapted to communicate at the end of the compression stroke of the piston with two crank case inlet ports and leaving a space between each other for the motion of the connecting rod.

In testimony whereof I affix my signature

LÉON DUFOUR.